United States Patent
Whitcomb et al.

(10) Patent No.: US 9,101,983 B2
(45) Date of Patent: *Aug. 11, 2015

(54) NANOWIRE PREPARATION METHODS, COMPOSITIONS, AND ARTICLES

(75) Inventors: David R. Whitcomb, Woodbury, MN (US); William D. Ramsden, Afton, MN (US)

(73) Assignee: Carestream Health, Inc., Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/482,312

(22) Filed: May 29, 2012

(65) Prior Publication Data

US 2012/0247272 A1 Oct. 4, 2012

Related U.S. Application Data

(63) Continuation-in-part of application No. 13/289,513, filed on Nov. 4, 2011.

(60) Provisional application No. 61/421,296, filed on Dec. 9, 2010, provisional application No. 61/432,218, filed (Continued)

(51) Int. Cl.
| | |
|---|---|
| *B22F 9/24* | (2006.01) |
| *B82B 3/00* | (2006.01) |
| *C22C 5/06* | (2006.01) |
| *B22F 1/00* | (2006.01) |
| *B82Y 30/00* | (2011.01) |

(52) U.S. Cl.
CPC ............... *B22F 9/24* (2013.01); *B22F 1/0025* (2013.01); *B82Y 30/00* (2013.01)

(58) Field of Classification Search
CPC .. B01J 23/63; C07C 2523/12; B01D 53/9418
USPC .......................................................... 75/371
See application file for complete search history.

(56) References Cited

U.S. PATENT DOCUMENTS

| | | | |
|---|---|---|---|
| 5,380,692 A * | 1/1995 | Nakatsuji et al. | 502/303 |
| 6,645,444 B2 * | 11/2003 | Goldstein | 423/1 |
| 2004/0188325 A1 * | 9/2004 | Stivers | 208/113 |
| 2009/0130433 A1 | 5/2009 | Takada | |
| 2012/0148436 A1 * | 6/2012 | Whitcomb et al. | 420/416 |

FOREIGN PATENT DOCUMENTS

| | | |
|---|---|---|
| CN | 101157140 A | 4/2008 |
| CN | 101244459 A | 8/2008 |
| CN | 101934377 | 1/2011 |
| CN | 102029400 | 4/2011 |

(Continued)

OTHER PUBLICATIONS

Sun et al. Crystalline silver nanowires by soft solution processing, Nano Letters, 2002, vol. 2, p. 165-168.*

(Continued)

*Primary Examiner* — Jie Yang
*Assistant Examiner* — Xiaowei Su
(74) *Attorney, Agent, or Firm* — Reed L. Christiansen

(57) ABSTRACT

Nanomaterial preparation methods, compositions, and articles are disclosed and claimed. Such methods can provide nanomaterials with improved morphologies relative to previous methods. Such materials are useful in electronic applications.

5 Claims, 3 Drawing Sheets

Related U.S. Application Data on Jan. 13, 2011, provisional application No. 61/488,813, filed on May 23, 2011, provisional application No. 61/494,072, filed on Jun. 7, 2011, provisional application No. 61/521,776, filed on Aug. 10, 2011, provisional application No. 61/521,859, filed on Aug. 10, 2011, provisional application No. 61/521,867, filed on Aug. 10, 2011, provisional application No. 61/522,258, filed on Aug. 11, 2011, provisional application No. 61/522,738, filed on Aug. 12, 2011, provisional application No. 61/522,749, filed on Aug. 12, 2011, provisional application No. 61/522,757, filed on Aug. 12, 2011, provisional application No. 61/522,766, filed on Aug. 12, 2011, provisional application No. 61/523,419, filed on Aug. 15, 2011, provisional application No. 61/523,882, filed on Aug. 16, 2011, provisional application No. 61/523,893, filed on Aug. 16, 2011, provisional application No. 61/500,156, filed on Jun. 23, 2011.

(56) References Cited

FOREIGN PATENT DOCUMENTS

| EP | 1 918 046 B1 | | 4/2012 |
|---|---|---|---|
| JP | 2008-190006 | | 8/2008 |
| JP | 2008190006 A | * | 8/2008 |
| JP | 2009-155674 | | 7/2009 |

OTHER PUBLICATIONS http://en.wikipedia.org/wiki/Thorium.*
Chen et al. Single-crystal nanowires of platinum can be synthesized by controlling the reaction rate of a polyol process, J. Am. Chem. Soc. 2004, vol. 126, p. 10854-10855.*
Sun et al. Chem. Mater., 2002, vol. 14, p. 4736-4745.*
Tang et al. Syntheses of silver nanowires in liquid phase, Nanowires Science and Technology, Feb. 2010, p. 25-43.*
Miyamoto et al., Machine translation of JP 2008-190006 A, Aug. 2008.*
Davis, Preparation and adsorptive properties of thorium oxide, University of Florida, 1965.*
Standard Reduction Potentials, http://en.wikipedia.org/wiki/Standard_electrode_potential_(data_page), Aug. 2014.*
Younan Xia, et al., "Shape-Controlled Synthesis of Metal Nanocrystals: Simple Chemistry Meets Complex Physics?", Angew. Chem. Int. Ed. 2009, 48, pp. 60-103.
Jinting Jiu, et al., "Preparation of Ag nanorods with high yield by polyol process," Mat. Chem. & Phys., 2009, 114, pp. 333-338.
Srichandana Nandikonda, "Microwave Assisted Synthesis of Silver Nanorods," M.S. Thesis, Auburn University, Aug. 9, 2010, 59 pages.
Srichandana Nandikonda, et al., "Effects of salt selection on the rapid synthesis of silver nanowires," Abstract INOR-200, 240$^{th}$ ACS National Meeting, Boston, MA, Aug. 23, 2010, 1 page.
Y.C. Lu, et al., "Tailoring of silver wires and their performance as transparent conductive coatings," Nanotechnology, 2010, 21, 215707, 6 pages.
Qiang Zhang, et al., "Production of Ag Nanocubes on Scale of 0.1 g per Batch by Protecting the NaHS-Mediated Polyol Synthesis with Argon," Applied Materials & Interfaces, 2009, 1, pp. 2044-2048.
Raymond W. Nims, et al., "Colormetric Assays for Nitric Oxide and Nitrogen Oxide Species Formed From Nitric Oxide Stock Solutions and Donor Compounds," Methods in Enzymology, 1996, 268, pp. 93-105.
International Search Report, International Application No. PCT/US2011/059493, dated Dec. 5, 2012, 2 pages.
K. Korte et al., Rapid synthesis of silver nanowires through a CuCl- or CuCl$_2$-mediated polyol process, The Royal Society of Chemistry, J. Mater. Chem., 2008, vol. 18, pp. 437-441.
H-Y Shi et al., Ordering of Disordered Nanowires: Spontaneous Formation of Highly Aligned, Ultralong Ag Nanowire Films at Oil-Water-Air Interface, Adv. Funct. Mater, 2010, vol. 20, pp. 958-964.
International Search Report, International Application No. PCT/US2012/040386. dated Dec. 5, 2012, 2 pages.

* cited by examiner

NANOWIRE PREPARATION METHODS, COMPOSITIONS, AND ARTICLES

CROSS REFERENCE TO RELATED APPLICATIONS

This application is a continuation-in-part of U.S. application Ser. No. 13/289,513, filed Nov. 4, 2011, entitled NANOWIRE PREPARATION METHODS, COMPOSITIONS, AND ARTICLES, which is incorporated by reference in its entirety, and which claimed the benefit of U.S. Provisional Application No. 61/421,296, filed Dec. 9, 2010, entitled LANTHANIDE CATALYSIS OF METAL ION REDUCTION, METHODS, COMPOSITIONS, AND ARTICLES; U.S. Provisional Application No. 61/432,218, filed Jan. 13, 2011, entitled PREPARATION OF AgNW IN THE PRESENCE OF NITRIC OXIDE; U.S. Provisional Application No. 61/488,813, filed May 23, 2011, entitled METAL ION REDUCTION WITH LOW NITRIC OXIDE COPRODUCTION, METHODS, COMPOSITIONS, AND ARTICLES; U.S. Provisional Application No. 61/494,072, filed Jun. 7, 2011, entitled NANOWIRE PREPARATION METHODS, COMPOSITIONS, AND ARTICLES; U.S. Provisional Application No. 61/521,776, filed Aug. 10, 2011, entitled NANOWIRE PREPARATION METHODS, COMPOSITIONS, AND ARTICLES; U.S. Provisional Application No. 61/521,859, filed Aug. 10, 2011, entitled NANOWIRE PREPARATION METHODS, COMPOSITIONS, AND ARTICLES; U.S. Provisional Application No. 61/521,867, filed Aug. 10, 2011, entitled NANOWIRE PREPARATION METHODS, COMPOSITIONS, AND ARTICLES; U.S. Provisional Application No. 61/522,258, filed Aug. 11, 2011, entitled NANOWIRE PREPARATION METHODS, COMPOSITIONS, AND ARTICLES; U.S. Provisional Application No. 61/522,738, filed Aug. 12, 2011, entitled NANOWIRE PREPARATION METHODS, COMPOSITIONS, AND ARTICLES; U.S. Provisional Application No. 61/522,749, filed Aug. 12, 2011, entitled NANOWIRE PREPARATION METHODS, COMPOSITIONS, AND ARTICLES; U.S. Provisional Application No. 61/522,757, filed Aug. 12, 2011, entitled NANOWIRE PREPARATION METHODS, COMPOSITIONS, AND ARTICLES; U.S. Provisional Application No. 61/522,766, filed Aug. 12, 2011, entitled NANOWIRE PREPARATION METHODS, COMPOSITIONS, AND ARTICLES; U.S. Provisional Application No. 61/523,419, filed Aug. 15, 2011, entitled NANOWIRE PREPARATION METHODS, COMPOSITIONS, AND ARTICLES; U.S. Provisional Application No. 61/523,882, filed Aug. 16, 2011, entitled NANOWIRE PREPARATION METHODS, COMPOSITIONS, AND ARTICLES; and U.S. Provisional Application No. 61/523,893, filed Aug. 16, 2011, entitled NANOWIRE PREPARATION METHODS, COMPOSITIONS, AND ARTICLES, each of which is hereby incorporated by reference in its entirety.

This application also claims the benefit of U.S. Provisional Application No. 61/500,156, filed Jun. 23, 2011, entitled NANOWIRE PREPARATION METHODS, COMPOSITIONS, AND ARTICLES, which is hereby incorporated by reference in its entirety.

BACKGROUND

The general preparation of silver nanowires (10-200 aspect ratio) is known. See, for example, *Angew. Chem. Int. Ed.* 2009, 48, 60, Y. Xia, Y. Xiong, B. Lim, S. E. Skrabalak, which is hereby incorporated by reference in its entirety. Such preparations typically employ $Fe^{2+}$ or $Cu^{2+}$ ions to "catalyze" the wire formation over other morphologies. The controlled preparation of silver nanowires having desired lengths and widths, however, is not known. For example, the $Fe^{2+}$ produces a wide variety of lengths or thicknesses and the $Cu^{2+}$ produces wires that are too thick for many applications.

The metal ions used to catalyze wire formation are generally primarily reported to be provided as a metal halide salt, usually as a metal chloride, for example, $FeCl_2$ or $CuCl_2$. See, for example, J. Jiu, K. Murai, D. Kim, K. Kim, K. Suganuma, *Mat. Chem. & Phys.*, 2009, 114, 333, which refers to NaCl, $CoCl_2$, $CuCl_2$, $NiCl_2$ and $ZnCl_2$; Japanese patent application publication JP2009155674, which describes $SnCl_4$; S. Nandikonda, "Microwave Assisted Synthesis of Silver Nanorods," M. S. Thesis, Auburn University, Aug. 9, 2010, which refers to NaCl, KCl, $MgCl_2$, $CaCl_2$, $MnCl_2$, $CuCl_2$, and $FeCl_3$; S. Nandikonda and E. W. Davis, "Effects of Salt Selection on the Rapid Synthesis of Silver Nanowires," Abstract INOR-299, 240th ACS National Meeting, Boston, Ma., Aug. 22-27, 2010, which discloses NaCl, KCl, $MgCl_2$, $CaCl_2$, $MnCl_2$, $CuCl_2$, $FeCl_3$, $Na_2S$, and NaI; Chinese patent application publication CN101934377, which discloses $Mn^{2+}$; Y. C. Lu, K. S. Chou, *Nanotech.*, 2010, 21, 215707, which discloses $Pd^{2+}$; and Chinese patent application publication CN102029400, which discloses NaCl, $MnCl_2$, and $Na_2S$.

SUMMARY

At least some embodiments provide methods comprising providing at least one first composition comprising at least one first reducible metal ion, and reducing the at least one first reducible metal ion to at least one first metal nanowire in the presence of at least one second metal ion comprising at least one lanthanide element or actinide element.

In such methods, the at least one first reducible metal ion may, for example, comprise at least one coinage metal ion, or at least one ion of an IUPAC Group 11 element, such as, for example, at least one silver ion. In at least some embodiments, the at least one first composition comprises silver nitrate.

In such methods, the at least one second metal ion may, for example, comprise at least one thorium ion. In some cases, the at least one second metal ion may comprise thorium in its +4 oxidation state. Some such methods may further comprise providing at least one compound comprising the at least one second metal ion at least nitrate moiety. An exemplary compound is thorium (IV) nitrate tetrahydrate.

In such methods, the reduction of the first reducible metal ion may, in some cases, occur in the presence of either or both of at least one protecting agent or at least one polyol.

In such methods, the at least one first metal nanowire may, for example, comprise an average diameter between about 10 nm and about 500 nm. In some cases, such an average diameter may be less than about 40 nm.

In such methods, the at least one first metal nanowire may, for example, comprise an aspect ratio between about 50 and about 10,000.

Some embodiments provide products comprising the at least one first metal produced by such methods. In some cases, such products may comprise at least one metal nanowire.

Other embodiments provide articles comprising such products.

Still other embodiments provide compositions comprising at least one metal nanowire and at least one lanthanide ion or actinide ion. In some cases, the at least one metal nanowire comprises at least one silver nanowire. Such a metal nanowire may, for example, comprise an average diameter between about 10 nm and about 500 nm. Or such a metal nanowire may, for example, comprise an aspect ratio between about 50 and about 10,000. Or such a metal nanowire may, for example, comprises an average diameter between about 10 nm and about 150 nm, and an aspect ratio between about 50 and about 10,000.

Yet still other embodiments provide products comprising such metal nanowires or articles comprising such products. Non-limiting examples of such articles include electronic displays, touch screens, portable telephones, cellular telephones, computer displays, laptop computers, tablet computers, point-of-purchase kiosks, music players, televisions, electronic games, electronic book readers, transparent electrodes, solar cells, light emitting diodes, other electronic devices, medical imaging devices, medical imaging media, and the like.

These embodiments and other variations and modifications may be better understood from the brief description of figures, description, exemplary embodiments, examples, and claims that follow. Any embodiments provided are given only by way of illustrative example. Other desirable objectives and advantages inherently achieved may occur or become apparent to those skilled in the art. The invention is defined by the appended claims.

DESCRIPTION

Figure 1:
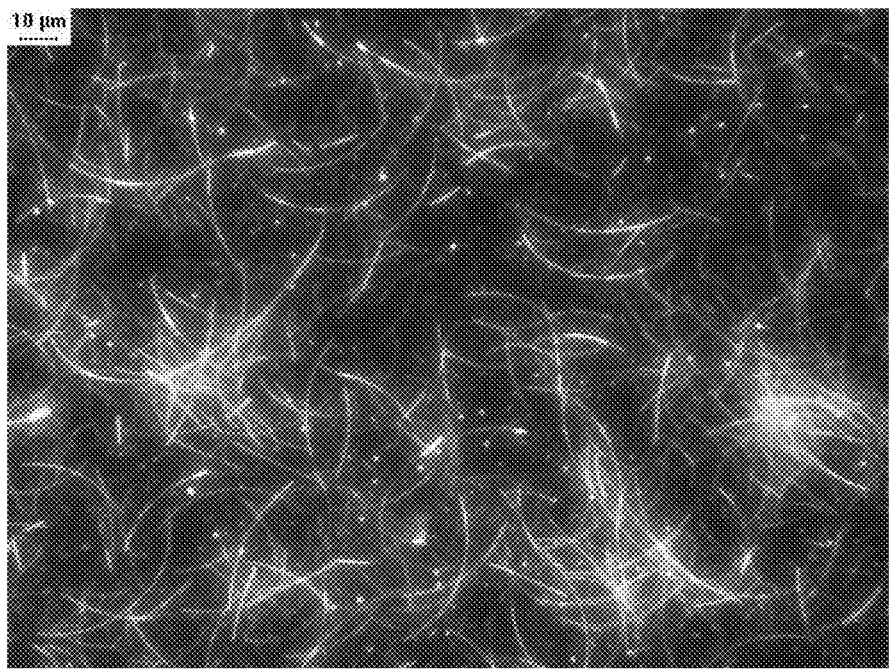
FIG. 1 shows an optical micrograph of the silver nanowire product of Example 1.

All publications, patents, and patent documents referred to in this document are incorporated by reference herein in their entirety, as though individually incorporated by reference.

U.S. application Ser. No. 13/289,513, filed Nov. 4, 2011, entitled NANOWIRE PREPARATION METHODS, COMPOSITIONS, AND ARTICLES, is hereby incorporated by reference in its entirety. U.S. Provisional Application No. 61/500,156, filed Jun. 23, 2012, entitled NANOWIRE PREPARATION METHODS, COMPOSITIONS, AND ARTICLES, is hereby incorporated by reference in its entirety.

Reducible Metal Ions and Metal Products

Some embodiments provide methods comprising reducing at least one reducible metal ion to at least one metal. A reducible metal ion is a cation that is capable of being reduced to a metal under some set of reaction conditions. In such methods, the at least one first reducible metal ion may, for example, comprise at least one coinage metal ion. A coinage metal ion is an ion of one of the coinage metals, which include copper, silver, and gold. Or such a reducible metal ion may, for example, comprise at least one ion of an IUPAC Group 11 element. An exemplary reducible metal ion is a silver cation. Such reducible metal ions may, in some cases, be provided as salts. For example, silver cations might, for example, be provided as silver nitrate.

In such embodiments, the at least one metal is that metal to which the at least one reducible metal ion is capable of being reduced. For example, silver would be the metal to which a silver cation would be capable of being reduced.

Nanostructures, Nanostructures, and Nanowires

In some embodiments, the metal product formed by such methods is a nanostructure, such as, for example, a one-dimensional nanostructure. Nanostructures are structures having at least one "nanoscale" dimension less than 300 nm, and at least one other dimension being much larger than the nanoscale dimension, such as, for example, at least about 10 or at least about 100 or at least about 200 or at least about 1000 times larger. Examples of such nanostructures are nanorods, nanowires, nanotubes, nanopyramids, nanoprisms, nanoplates, and the like. "One-dimensional" nanostructures have one dimension that is much larger than the other two dimensions, such as, for example, at least about 10 or at least about 100 or at least about 200 or at least about 1000 times larger.

Such one-dimensional nanostructures may, in some cases, comprise nanowires. Nanowires are one-dimensional nanostructures in which the two short dimensions (the thickness dimensions) are less than 300 nm, preferably less than 100 nm, while the third dimension (the length dimension) is greater than 1 micron, preferably greater than 10 microns, and the aspect ratio (ratio of the length dimension to the larger of the two thickness dimensions) is greater than five. Nanowires are being employed as conductors in electronic devices or as elements in optical devices, among other possible uses. Silver nanowires are preferred in some such applications.

Such methods may be used to prepare nanostructures other than nanowires, such as, for example, nanocubes, nanorods, nanopyramids, nanotubes, and the like. Nanowires and other nanostructure products may be incorporated into articles, such as, for example, electronic displays, touch screens, portable telephones, cellular telephones, computer displays, laptop computers, tablet computers, point-of-purchase kiosks, music players, televisions, electronic games, electronic book readers, transparent electrodes, solar cells, light emitting diodes, other electronic devices, medical imaging devices, medical imaging media, and the like.

Preparation Methods

A common method of preparing nanostructures, such as, for example, nanowires, is the "polyol" process. Such a process is described in, for example, *Angew. Chem. Int. Ed.* 2009, 48, 60, Y. Xia, Y. Xiong, B. Lim, S. E. Skrabalak, which is hereby incorporated by reference in its entirety. Such processes typically reduce a metal cation, such as, for example, a silver cation, to the desired metal nanostructure product, such as, for example, a silver nanowire. Such a reduction may be carried out in a reaction mixture that may, for example, comprise one or more polyols, such as, for example, ethylene glycol (EG), propylene glycol, butanediol, glycerol, sugars, carbohydrates, and the like; one or more protecting agents, such as, for example, polyvinylpyrrolidinone (also known as polyvinylpyrrolidone or PVP), other polar polymers or copolymers, surfactants, acids, and the like; and one or more metal ions. These and other components may be used in such reaction mixtures, as is known in the art. The reduction may, for example, be carried out at one or more temperatures from about 90° C. to about 190° C.

Actinide Ions

In some embodiments, the reduction of the reducible metal ion occurs in the presence of at least one second metal ion comprising at least one actinide element. Such a reduction may, for example, occur in the presence of at least one actinide element in its +2, +3, or +4 oxidation state. An exemplary second metal ion is $Th^{4+}$. Such an ion may, for example, be provided by such compounds as thorium (IV) nitrate tetrahydrate.

EXEMPLARY EMBODIMENTS

U.S. Provisional Application No. 61/500,156, filed Jun. 23, 2012, entitled NANOWIRE PREPARATION METHODS, COMPOSITIONS, AND ARTICLES, which is hereby incorporated by reference in its entirety, disclosed the following 20 non-limiting exemplary embodiments.

A. A method comprising:
   providing at least one first composition comprising at least one first reducible metal ion; and
   reducing the at least one first reducible metal ion to at least one first metal in the presence of at least one second metal ion comprising at least one lanthanide element or actinide element.

B. The method according to embodiment A, wherein the at least one first reducible metal ion comprises at least one coinage metal ion.

C. The method according to embodiment A, wherein the at least one first reducible metal ion comprises at least one ion of an IUPAC Group 11 element.

D. The method according to embodiment A, wherein the at least one first reducible metal ion comprises at least one silver ion.

E. The method according to embodiment A, wherein the at least one composition comprises silver nitrate.

F. The method according to embodiment A, wherein the at least one second metal ion comprises at least one thorium ion.

G. The method according to embodiment A, wherein the at least one second metal ion comprises thorium in its +4 oxidation state.

H. The method according to embodiment A, wherein the reduction occurs in the presence of at least one protecting agent.

J. The method according to embodiment A, wherein the reduction occurs in the presence of at least one polyol.

K. A product comprising the at least one first metal produced by the method according to embodiment A.

L. The product according to embodiment K comprising at least one metal nanowire.

M. An article comprising the product according to embodiment K.

N. A composition comprising at least one metal nanowire, at least one chloride ion, and at least one ion of a lanthanide element or at least one ion of an actinide element.

P. The composition according to embodiment N, wherein the at least one metal nanowire comprises at least one silver nanowire.

Q. The composition according to embodiment N, wherein the at least one metal nanowire comprises an average diameter between about 10 nm and about 500 nm.

R. The composition according to embodiment N, wherein the at least one metal nanowire comprises an aspect ratio between about 50 and about 10,000.

S. The composition according to embodiment N, wherein the at least one metal nanowire comprises an average diameter between about 10 nm and about 150 nm, and an aspect ratio between about 50 and about 10,000.

T. A product comprising the at least one metal nanowire of the composition of embodiment N.

U. An article comprising the at least one product according to embodiment T.

V. The article according to embodiment U comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

EXAMPLES

Example 1

A 500 mL reaction flask containing 280 mL ethylene glycol (EG), 17.8 mg of thorium (IV) nitrate tetrahydrate, and 5.3 g of 27 mM sodium chloride in EG was degassed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the flask was then heated to 145° C. Stock solutions of 0.50 M $AgNO_3$ in EG and 0.84 M polyvinylpyrrolidinone (PVP, 55,000 weight-average molecular weight) in EG were also degassed with nitrogen for, then 20 mL syringes of each were prepared. The $AgNO_3$ and PVP solutions were then added at a constant rate over 25 min via a 12 gauge a TEFLON® fluoropolymer syringe needle. The flask was then held at temperature for 120 min, after which it was allowed to cool down to ambient temperature.

FIG. 1 shows an optical micrograph of the silver nanowire product, which had an average nanowire length of 28.2±10.4 μm and an average nanowire diameter of 56.1±13.7 nm, based upon measurement of at least 100 wires.

Example 2

Into a 500 mL reaction flask was added 290 mL propylene glycol (PG), and 4.4 g polyvinylpyrrolidinone (PVP, 55,000 weight-average molecular weight). The headspace of the flask was blanketed with nitrogen at approximately 0.5 L/min and was heated to 110° C. while being stirred. 12.0 mL of 1.0 M $AgNO_3$ in PG and 10.0 mL of 42 mM lithium chloride in PG were added to the flask, each at a constant rate of 0.5 L/min, with the addition of the lithium chloride solution being delayed until 4.0 min after initiating the $AgNO_3$ solution feed. Immediately after completing feeding the $AgNO_3$ solution, 12.0 mL of 11 mM thorium (IV) nitrate tetrahydrate in PG was added to the flask at a constant rate of 0.5 L/min. The flask was then held at temperature for 132 min, after which it was allowed to cool down to ambient temperature.

Figure 2:
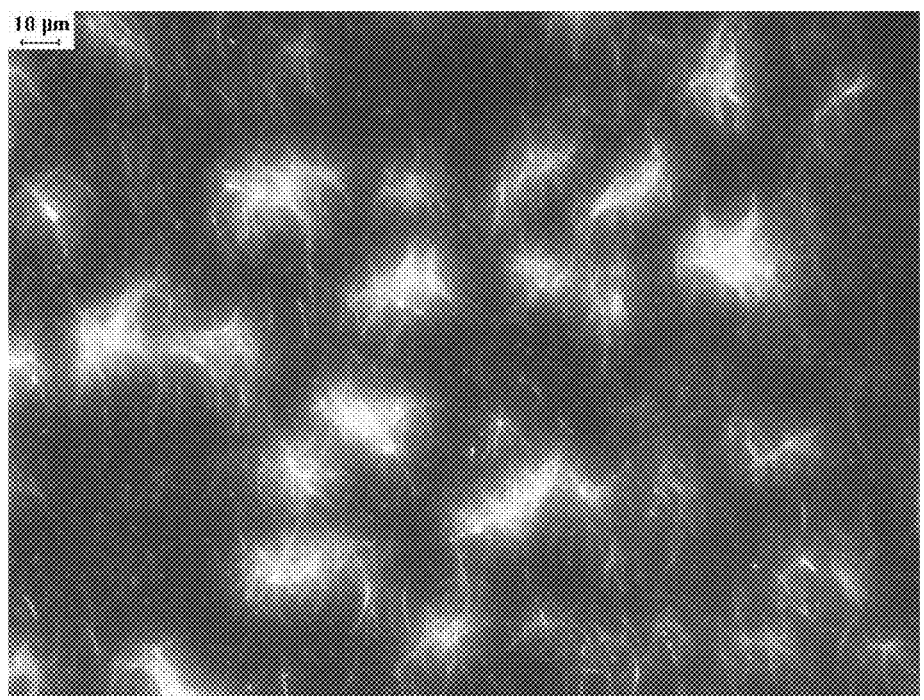
FIG. 2 shows an optical micrograph of the silver nanowire product of Example 2.

FIG. 2 shows an optical micrograph of the silver nanowire product, which had an average nanowire length of 10.2±6.6 μm and an average nanowire diameter of 36.8±6.0 nm, based upon measurement of at least 100 wires.

Example 3

Into a 500 mL reaction flask was added 290 mL propylene glycol (PG), and 4.5 g polyvinylpyrrolidinone (PVP, 55,000 weight-average molecular weight). The headspace of the flask was blanketed with nitrogen at approximately 0.5 L/min and was heated to 110° C. while being stirred. 12.0 mL of 1.0 M $AgNO_3$ in PG and 10.0 mL of 42 mM lithium chloride in PG were added to the flask, each at a constant rate of 0.5 L/min, with the addition of the lithium chloride solution being delayed until 4.0 min after initiating the $AgNO_3$ solution feed. Immediately after completing feeding the $AgNO_3$ solution, 12.0 mL of solution of 1.0 M $AgNO_3$ and 11 mM thorium (IV) nitrate tetrahydrate in PG was added to the flask at a constant rate of 0.5 L/min. The flask was then held at temperature for 102 min, after which it was allowed to cool down to ambient temperature.

Figure 3:
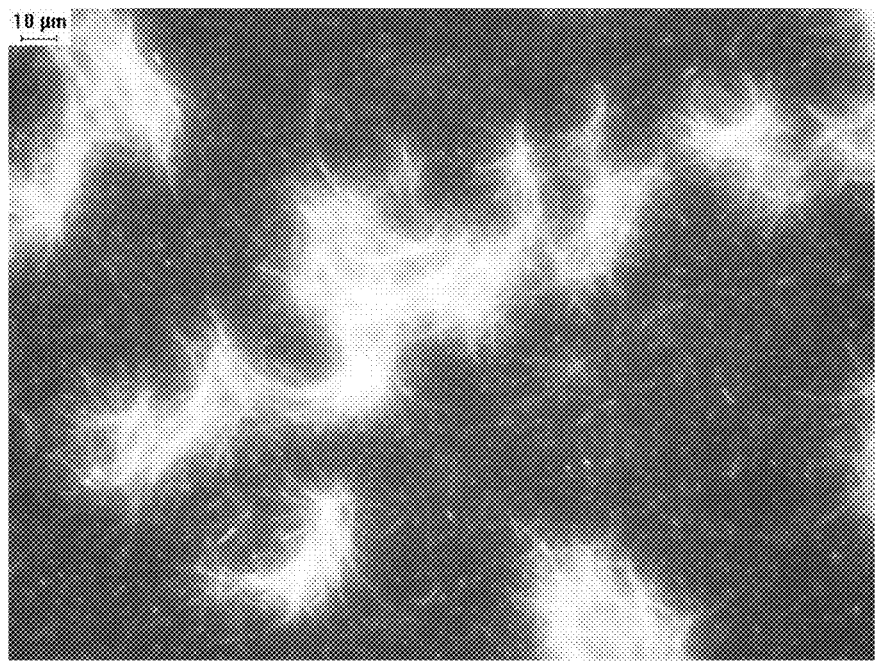
FIG. 3 shows an optical micrograph of the silver nanowire product of Example 3.

FIG. 3 shows an optical micrograph of the silver nanowire product, which had an average nanowire length of 16.3±6.9

μm and an average nanowire diameter of 35.9±6.2 nm, based upon measurement of at least 100 wires.

The invention has been described in detail with reference to particular embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed:

1. A method comprising:
   providing at least one first composition comprising at least one silver ion;
   providing at least one compound comprising thorium (IV) nitrate tetrahydrate; and
   reducing the at least one silver ion to at least one silver metal nanowire in the presence of a solution comprising at least one thorium ion,
   wherein the at least one silver metal nanowire consists of elemental silver.

2. The method according to claim 1, wherein the reduction occurs in the presence of at least one protecting agent or at least one polyol.

3. The method according to claim 1, wherein the at least one silver metal nanowire comprises an average diameter between about 10 nm and about 500 nm.

4. The method according to claim 3, wherein the at least one silver metal nanowire comprises an average diameter less than about 40 nm.

5. The method according to claim 1, wherein the at least one silver metal comprises an aspect ratio between about 50 and about 10,000.

* * * * *